United States Patent [19]

Lee

[11] Patent Number: 4,856,194
[45] Date of Patent: Aug. 15, 1989

[54] CUTTING ATTACHMENT FOR TRIMMERS

[76] Inventor: Anthony L. Lee, P.O. Box 617, Walnut Grove, Calif. 95690

[21] Appl. No.: 96,669

[22] Filed: Sep. 15, 1987

[51] Int. Cl.$^4$ .............................................. B26B 7/00
[52] U.S. Cl. ........................................ 30/276; 56/12.7
[58] Field of Search ................... 30/276, 347; 56/12.7, 56/295

[56] References Cited

U.S. PATENT DOCUMENTS 4,202,094  5/1980  Kalman ................................. 30/276
4,270,271  6/1981  Feldman et al. ....................... 30/276

FOREIGN PATENT DOCUMENTS 2382840  11/1978  France ................................. 30/276

*Primary Examiner*—Frank T. Yost
*Assistant Examiner*—Willmon Fridie, Jr.
*Attorney, Agent, or Firm*—Flehr, Hohbach, Test, Albritton & Herbert

[57] ABSTRACT

Cutting attachment for a cutting device having first and second mating body sections forming a rigid body. The first body section has a generally vertical side wall portion, a downwardly and inwardly inclined bottom wall portion, an upwardly inwardly extending wall portion adjoining said bottom wall portion. The second body section has a generally vertical side wall portion, an inwardly extending and generally horizontal portion adjoining said generally vertical portion and an upwardly and inwardly inclined portion adjoining said horizontal portion. The first and second body sections are interconnected to form a rigid body and to cause said upwardly and inwardly extending portion of said first body section and said upwardly and inwardly inclined portion of said second body section to adjoin each other to provide a relatively smooth inner surface in the form of a truncated cone. A connector is carried by the upwardly and inwardly inclined portion adapted to be coupled to the cutting device. Cutting elements are carried by the body and are movable between cutting positions and out-of-the way positions within the outer confines of the body.

11 Claims, 4 Drawing Sheets

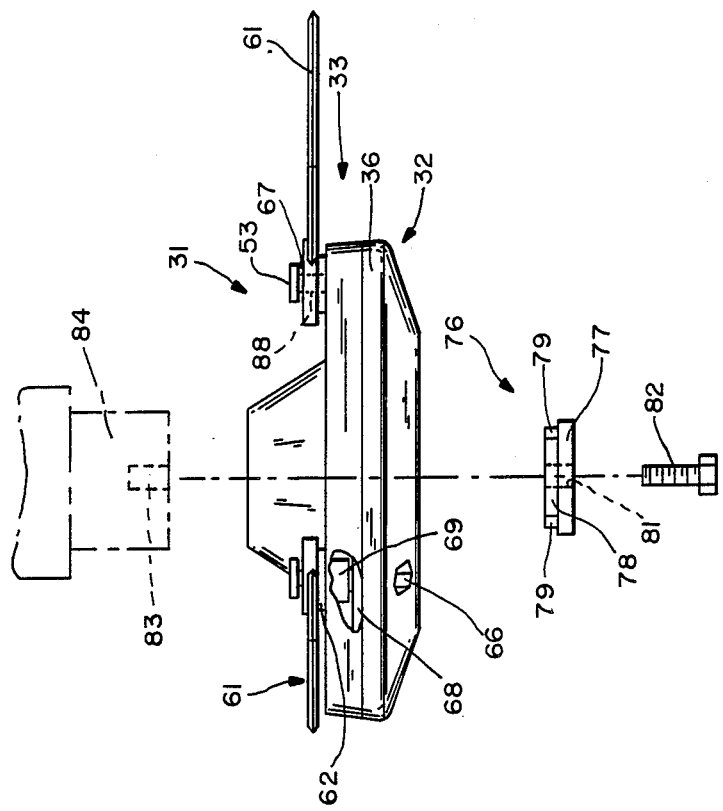
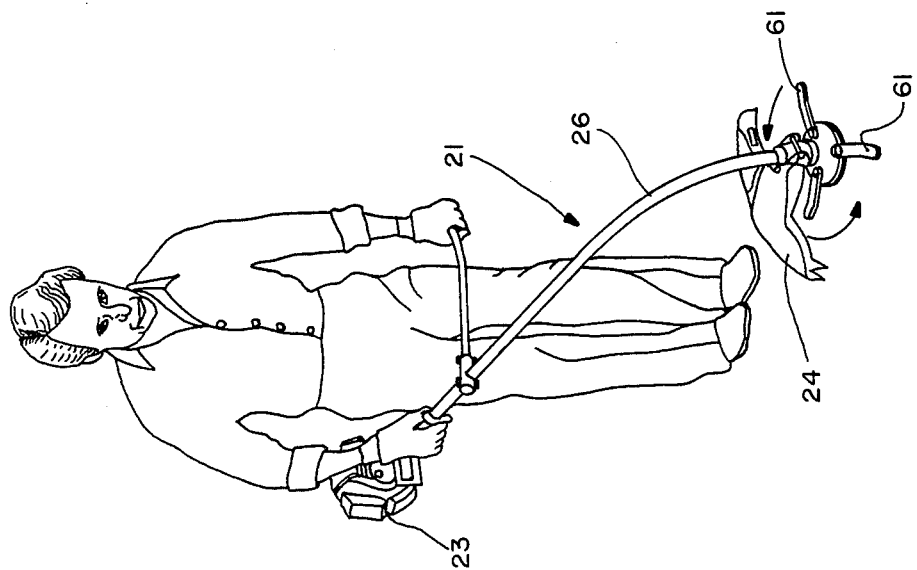
FIG.—2
FIG.—1

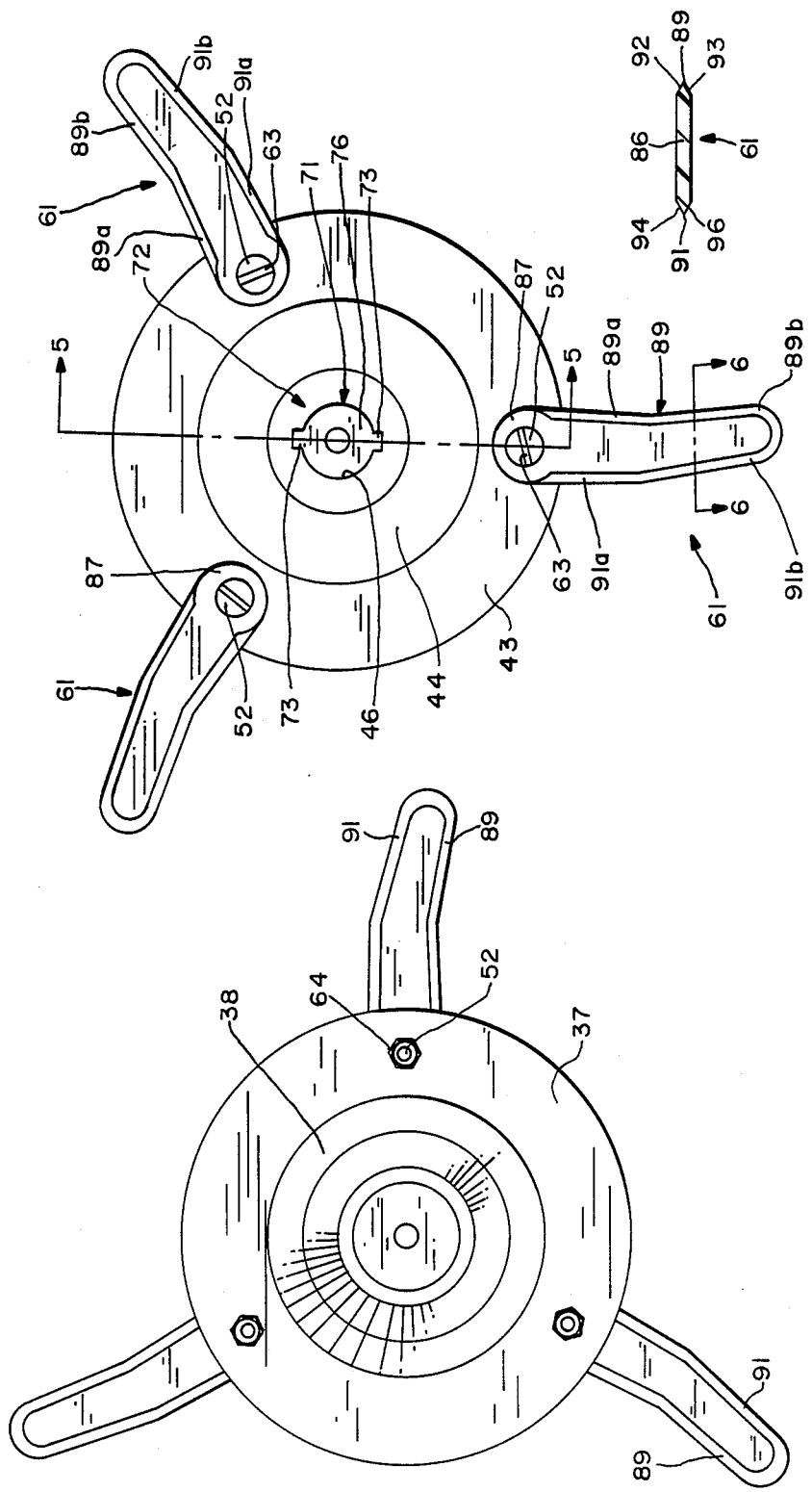

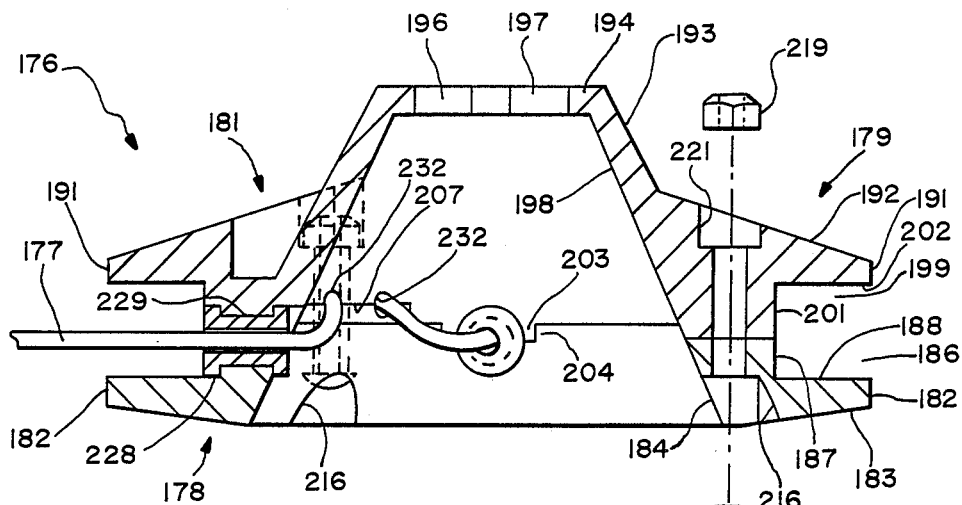
FIG.-10
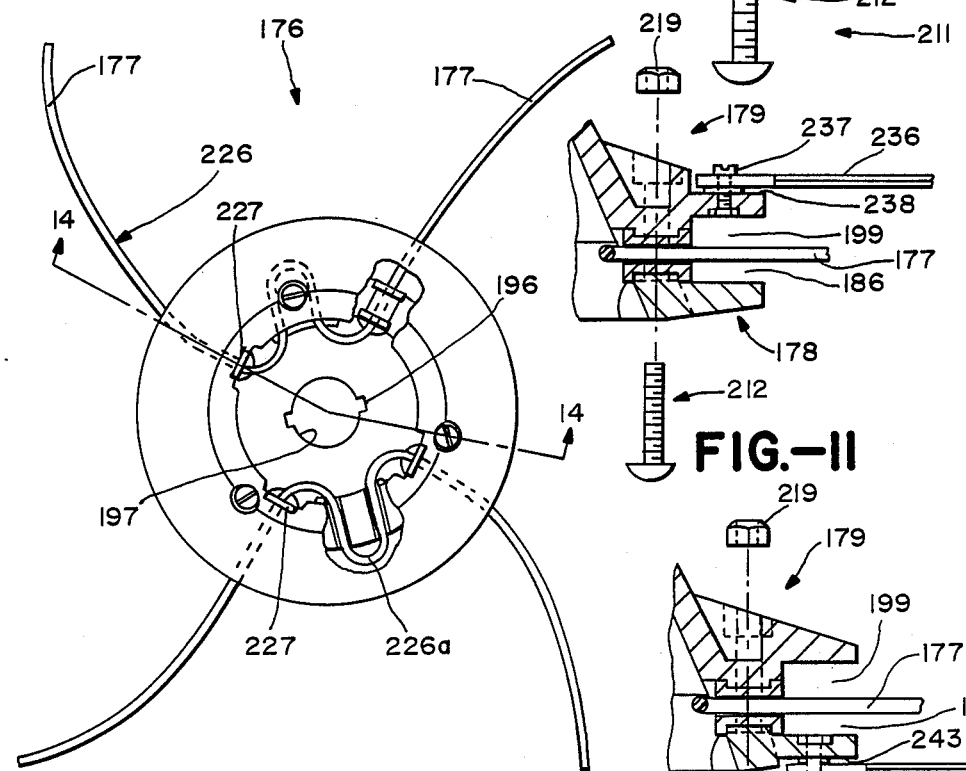
FIG.-9
FIG.-11
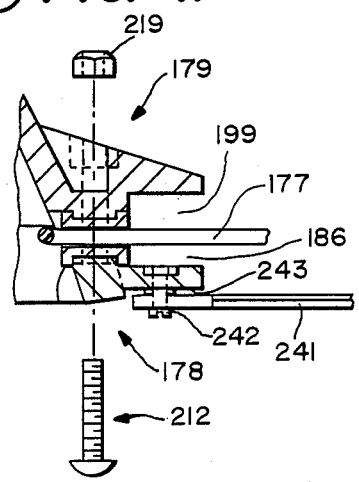
FIG.-12

1

CUTTING ATTACHMENT FOR TRIMMERS

This invention relates to trimmers, and more particular, to cutting attachments for use therewith.

In the past numerous and various types of power trimmers and cutters have heretofore been provided However, such trimmers and cutters have a number of disadvantages. For example, they have been found to have inadequate skid plates. They have also been found to have cutting blades which wear out quickly and which are ineffective in cutting various types of grasses, weeds and other materials In addition it has been found that there is difficulty in attaching the coupling attachments to various types of trimmers. There is therefore a need for a new and improved cutting attachment for trimmers.

In general, it is an object of the present invention to provide a cutting attachment which has a greatly improved skid plate.

Another object of the invention is to provide a cutting attachment of the above character which has a self-cleaning shape.

Another object of the invention is to provide a cutting attachment of the above character which has a very clean inner surface to inhibit weeds from becoming caught in the same.

Another object of the invention is to provide a cutting attachment of the above character which has improved cutting elements Another object of the invention is to provide a cutting attachment of the above character in which the means provided for securing the cutting elements to the body of the attachment is not subject to wear.

Another object of the invention is to provide a cutting attachment of the above character which will not become entangled in the weeds and/or grass being cut.

Another object of the invention is to provide a cutting attachment of the above character in which the cutting elements can be moved to a fully out-of-the way position in the event an obstruction is encountered.

Another object of the invention is to provide a cutting attachment of the above character in which the cutting elements can be readily replaced.

Another object of the invention is to provide a cutting attachment of the above character in which the cutting elements are in the form of blades which can be reversed to obtain different types of cutting action.

Another object of the invention is to provide a cutting attachment of the above character in which the cutting elements are movable between out-of-the way and cutting positions.

Another object of the invention is to provide a cutting attachment of the above character which has cutting strings.

Another object of the invention is to provide a cutting attachment of the above character which is provided with cutting elements and with cutting strings.

Another object of the invention is to provide a cutting attachment of the above character in which the cutting attachments can be provided above or below the cutting strings.

Another object of the invention is to provide a cutting attachment of the above character which can be readily coupled to various types of trimmers.

Additional objects and features of the invention will appear from the following description in which the preferred embodiments e set forth in detail in conjunction with the accompanying drawings.

FIG. 1 is a perspective view of a conventional trimmer having a cutting attachment incorporating the present invention mounted thereon.

FIG. 2 is a side elevational view of a cutting attachment incorporating the present invention with certain portions broken away and with certain portions shown being shown in exploded form.

FIG. 3 is a bottom plan view of the cutting attachment shown in FIG. 2.

FIG. 4 is a top plan view of the cutting attachment shown in FIG. 2.

FIG. 6 is a cross-sectional view taken along the lines 6—6 of FIG. 4.

FIG. 9 is a bottom plan view of another embodiment of a cutting attachment shown in the present invention utilizing cutting strings.

FIG. 10 is a cross-sectional view taken along the lines 14—14 of FIG. 13.

FIG. 11 is a partial cross-sectional view of a cutting attachment incorporating the present invention utilizing cutting elements in combination with cutting strings and in which the cutting elements are positioned above the cutting strings.

FIG. 12 is a partial cross-sectional view of another embodiment of the cutting attachment incorporating the present invention showing the cutting elements being disposed below the cutting strings.

Figure 5:
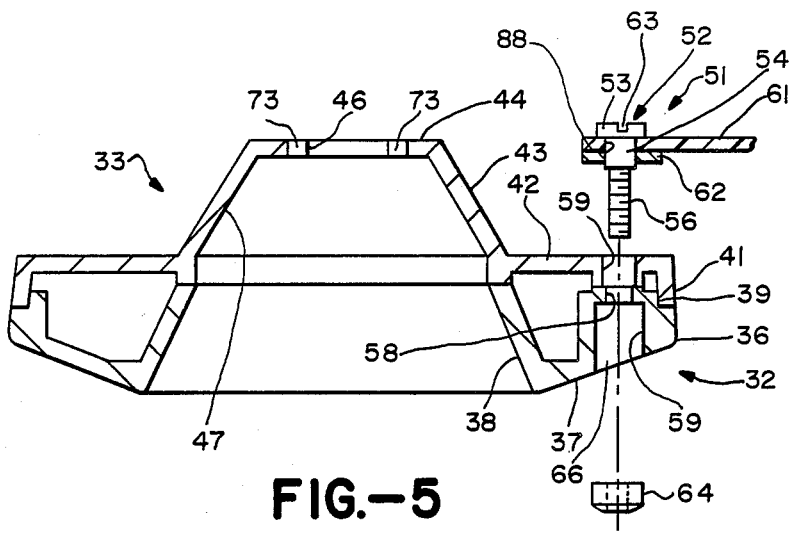
FIG. 5 is a cross-sectional view of the cutting attachment taken along the line of 5—5 of FIG. 4.

In general the cutting attachment for a trimmer is comprised of first and second mating body sections. The first body section is provided with a generally vertical side wall portion, a downwardly and inwardly inclined bottom wall portion adjoining said side wall portion and an upwardly and inwardly extending inner wall portion adjoining the bottom wall portion. The second body section has a generally vertical side wall portion and an inwardly extending generally horizontal portion adjoining said generally vertical portion and an upwardly and inwardly inclined portion adjoining the horizontal portion. Means is provided for interconnecting the first and second body sections to form a rigid body with said upwardly and inwardly inclined portion of said first body section and said upwardly and inwardly inclined portion of said second body section providing surfaces which provide a relatively smooth surface in the form of a truncated cone. Coupling means is carried by the upwardly and inwardly extending inclined portion and is adapted to be coupled to the trimmer. A plurality of cutting elements are carried by the body and are movable between cutting positions and out-of-the way positions.

More in particular as shown in the drawings, there is a trimmer 21 of a conventional construction such as manufactured by Echo Incorporated of Lake Zurich, Ill., 60047. A cutting attachment 22 incorporating the present invention is mounted thereon. The trimmer 21 is provided with a motor 23 which drives the attachment 22. A debris shield 24 is carried by the support member 26 which encloses the drive line (not shown) which drives the cutting attachment 22 from the motor 23.

The cutting attachment 22 is comprised of a rigid body 31 formed of a suitable material such as a high strength plastic The rigid body consists of a lower first body section 32 which mates with an upper second body section 33. The lower first body section 32 is provided with a generally vertical side wall portion 36 and a downwardly and inwardly inclined bottom portion 37 which adjoins the side wall portion 36. It is also provided with an upwardly and inwardly extending inner wall portion 38 which adjoins the bottom wall portion 37.

The second or upper body section 33 is provided with a generally vertical side wall portion 41 and an inwardly extending generally horizontal portion 42 adjoining the generally vertical side wall portion 41. An upwardly and inwardly inclined wall portion 43 is provided which adjoins the portion 42. An inwardly extending lip 44 is provided which adjoins the portion 43. The inwardly extending lip 44 defines a centrally disposed opening or hole 46. The wall portion 43 has an upwardly and inwardly inclined inner wall 47.

The first and second body sections 32 and 33 are adapted to mate with each other with the side wall 41 in a suitable plane within the annular recess 39, provided in the vertical side wall portion 46. The mated first and second body sections 32 and 3 provide upwardly and inwardly extending wall portions 38 of the first body section 32 which adjoin the surface 47 of the second body section 33 to provide a relatively smooth inner surface in the form of a truncated cone.

Means is provided for fastening together the two body sections 32 and 33 to form the rigid body 31 which consists of a plurality of bolts 51. The bolts 51 consist of screws 52 which have a head 53, a shoulder 54 and a threaded portion 56. The screws 52 are adapted to be seated in bores 58 provided in the upper second body section 33 and are spaced circumferentially on the horizontal portion 42, as for example 120° apart. The shoulders 54 are adapted to seat in enlarged bores 59 above the bores 58 and are concentric with the bores 58. A blade 61 is adapted to be carried on the shoulder 54 of each screw 52 and is retained between the head 53 and a washer 62 underlying the blade 61. The height of the shoulder 54 provided on the screw 52 is such as to provide a space 67 between the head 53 of the screw of the upper portion of the blade 61. The screw head 53 is provided with a slot 63 which is adapted to receive a screwdriver so that the screw 52 can be threaded into a self-locking nut 64 seated within a recess 66 provided in the portion 37. Reinforcing bosses 68 and 69 are provided within the lower and upper body sections 32 and 33 where the bolts 57 extend so as to provide additional rigidity to the body sections 32 and 33 where the bolts extend therethrough.

Means is provided for coupling the cutting attachment 22 to the trimmer 21 in the form of a key way adapter system 71. The key way system 71 consists of a key way formed by a pair of slots 73 diametrically disposed on opposite sides of the opening 46. The key way adapter system 71 also includes an adapter 76 which consists of a circular member 77 which has a diameter which is greater than the diameter of the opening 46. The adapter 76 is also provided with an upstanding circular member 78 which is formed integral with the member 77 and has a diameter which corresponds to the diameter of the opening 46 so that it can fit therein. The upstanding member 78 is provided with a pair of diametrically disposed ears or keys 79 which are adapted to fit into the key way provided by the diametrically disposed slots 73. The member 77 with its upstanding member 78 is provided with a hole 81 extending therethrough which receives a screw 82 that to be threaded into a threaded bore 83 provided in the lower extremity of a rotating hub 84 which is carried by the support member 26 of the trimmer 21. By providing various types of adapters 76, it can be seen that the cutting attachment 22 can be used on various models of trimmers. It is only necessary to change the adapter 76 to accommodate various types of hubs 84 carried by various types of trimmers.

The blades 61 which are shown in FIGS. 2, 3 and 4 of the cutting attachment 22 are formed of a high impact plastic and are movable between outwardly extended cutting positions and retracted or out-of-the way positions as shown by dotted lines in FIG. 4 in which the blades are totally disposed within the circumference of the rigid body 31.

The blade 61 is formed of an elongate body 86 of a high impact plastic and is provided with a rounded inner extremity 87 through which a hole 88 extends and through which the screw 52 extends. The blade 61 generally has a width of approximately $\frac{3}{4}$ of an inch and has a thickness of approximately $\frac{1}{8}$ of an inch. It has a length of approximately $3\frac{1}{2}$ inches extending from the hole 88. The blade 61 is provided with first and second leading edges 89 and 91 which are formed by beveled surfaces 92 and 93 for the leading edge 89 and beveled surface 94 and 96 for the leading edge 91. The bevels extend at a suitable angle as, for example, 45°. The leading edge 89 is formed with two portions 89a and 89b which portion 89b extends at a suitable angle, as for example, 10° with respect to portion 89a. Similarly, the leading edge 91 is formed of two portions 91a and 91b in which the portion 91b has an angle of approximately 20° with respect to the portion of the leading edge 91a. The leading edge 89 as hereinafter described is utilized for cutting soft grass whereas the leading edge 91 is utilized for cutting hard grass. Depending upon the direction of rotation of the cutting attachment, either the leading edge 89 or the leading edge 91 can be formed as a cutting edge by merely turning the blade upside down after the screw 52 has been removed and then replaced.

Operation and use of the cutting attachment shown in FIGS. 1–6 may now be briefly described as follows. Let it be assumed that the cutting attachment 22 has been secured to a conventional trimmer 21 by use of a key way adapter system 71 by fitting the adapter 76 to the key way 72 and fastening it to the rotating hub 84. The trimmer 21 can now be placed in operation in a conventional manner. As can be seen in FIG. 1, the cutting attachment 22 can be operated in close proximity to the ground from which the weeds or grass are being cut. As soon as the cutting attachment 22 is rotated, the blades 61 will swing outwardly under centrifugal force. Let it be assumed that the blades 61 have been mounted in such a manner so that the leading edges 89 are facing in the counterclockwise direction as viewed from the top during rotating of the cutting attachment In the event the blades 61 strike an object while they are being rotated, the blades 61 are moved inwardly over the top of the rigid body 31 to protect the same. The angle provided in the blades in addition to facilitating the slicing action of the blades also facilitates positioning of the blades within the upper confines of the body in the event an object is struck by the blades.

It has been found that blades of the construction hereinbefore described provide improved cutting action by utilizing a combination of a slicing action and a shearing impact action. This makes it possible to utilize smaller motors on the trimmers for cutting the same type of grass and/or weeds without stalling the motor, or alternatively, makes it possible to cut larger size weeds with the same size motor.

In the event it is desired to cut soft grass or smaller weeds, the shoulder type screws 52 can be removed and the blades 61 can be turned upside down so that the cutting edges 91 are facing in a counter clockwise direction. The screws 52 can then be reinserted and the nuts 64 threaded thereon.

Figure 7:
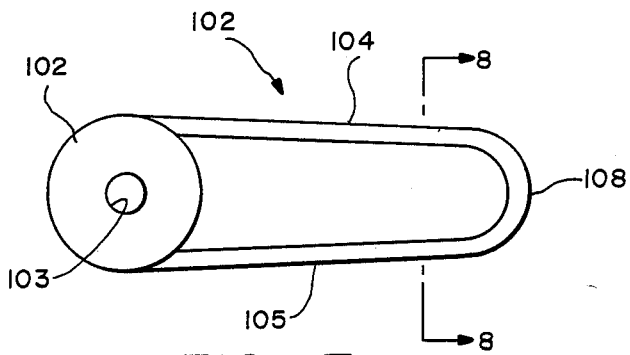
FIG. 7 is a top plan view of another blade which can be utilized with the cutting attachment shown in FIGS. 1-5.
Figure 8:
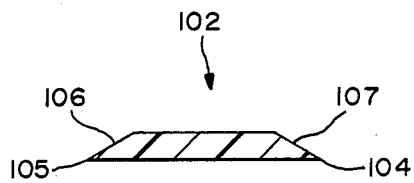
FIG. 8 is a cross-sectional view of the blades shown in FIG. 7 taken along the line 8—8 of FIG. 7.

The rigid body 31 is constructed in such a manner so that the lower first body section serves as a skid plate which can readily skid over small rocks and other obstructions It also can be seen that the skid plate is provided with recesses 66 in which the nuts 64 fastening the screws 52 are provided. This protects the nuts and the screws from wear. The body 31 is also constructed in such a manner that it has a smooth inner truncated conical surface which inhibits the collection of weeds, grass and debris within the center of the same but rather causes the same to be thrown downwardly and outwardly away from the center of rotation of the cutting attachment Another type of cutting blade for use on the cutting attachment 22 is the straight cutting blade 101 shown in FIGS. 7 and 8. The blade 101 is provided with a rounded end 102 which is provided with a central hole 103. The blade 101 is provided with cutting edges 104 and 105 which are formed by tapered surfaces 106 and 107 extending into a rounded end. The blade 101 is a general purpose blade.

Another embodiment of the invention is shown in FIGS. 9 and 10 in which a cutting attachment 176 is shown that is particularly adapted to carry cutting strings 177. The cutting attachment 176 consists of first and second mating body sections 178 and 179 which form a rigid body 181. The first and second body sections 178 and 179 are formed of a suitable material such as a high impact plastic.

The first or lower body section 178 is provided with a vertical side wall portion 182, a downwardly and inwardly inclined portion 183 adjoining the portion 182 and an upwardly and inwardly extending side wall portion 184 adjoining the downwardly and inwardly inclined portion 183. The first body section 178 is provided with an annular recess 186 which is defined by a vertically extending surface 187 and a horizontal surface 188.

The second or upper body section 179 is provided with a vertical side wall 191 which adjoins a tapered or inclined side wall 192. An upwardly and inwardly inclined side wall 193 adjoins the side wall 192. A horizontal wall 194 adjoins the upper extremity of the side wall 193 and is provided with a keyway 196 formed by slots on opposite sides of an opening 197. The second body section 179 is also provided with an upwardly and inwardly inclined inner wall 198. The second or upper body section 179 is provided with an annular recess 199 which is defined by a vertical wall 201 and a horizontal wall 202.

The first and second body sections 178 and 179 are adapted to mate with each other with the annular recesses 199 overlying the recess 186 and with the vertical walls 187 and 201 being in alignment. Cooperative means is carried by the vertical walls 187 and 201 to prevent rotation of one body section with respect to the other body section and as shown in FIG. 14 can consist of four circumferentially spaced 90° apart downwardly extending rectangular protrusions 203 formed in the vertical wall 201 of the second or upper part 179 which are adapted to mate with four corresponding rectangular recesses 204 formed in the wall 187 of the first or lower section 178. Also, two rectangular protrusions 206 spaced 180° apart are formed in the wall 187 and are adapted to mate with two rectangular recess 207 formed in the wall 201. In addition, when the first and second body sections 178 and 179 are mated, the inner wall 184 of the first or lower body section 178 is in alignment with the inwardly and upwardly extending wall 198 of the second or upper body section 179 and adjoins each other to provide a relatively smooth inner surface in the form of a truncated cone.

Means is provided for fastening together the two body sections 178 and 179 and consists of a plurality of bolts 211. The bolts 211 consist of screws 212. The screws 212 have heads 213 and threaded portions 214. The heads 213 are seated in arcuate recesses 216 and extend through aligned holes 217 and 218 provided in the sections 178 and are adapted to be threaded into nuts 219 seated in recesses 221 provided in the second or upper body section 179.

The four cutting strings 177 which are spaced approximately 90° apart and forming a part of the cutting attachment 176 can be provided in any suitable manner. Thus by way of example as shown in FIGS. 13 and 14, the four cutting strings 177 can be formed by a pair of elongate cutting elements 226 formed of a suitable material such as a high impact plastic card. The portions of the cutting elements 226 forming the cutting strings 177 extend through flanged grommets 227 formed of a suitable material such as brass mounted between the first and second body sections 178 and 179 in semicircular recesses 228 provided in the recesses 204 and corresponding semicircular recesses 229 provided in the overlying protrusions 203 provided in the top or second body section 179. After extending through the grommets 227, each of the cutting elements 226 is formed into a loop portion 226a which is seated in two spaced semicircular recesses 231 and 232 which are formed respectfully in the protrusion 206 provided in the first body section 178 and the cooperating recess 207 of the second or top body section 179 and are retained therein. Thus it can be seen that each of the cutting elements 226 provides two of the cutting strings 177.

Operation and use of the cutting attachment 176 may now be briefly described. The cutting attachment 176 can be secured to a conventional trimmer by the same keyway adapter system hereinbefore described in connection with the previous embodiments of the invention. The trimmer can then be placed in operation in a conventional manner. The cutting attachment 176 can be operated in close proximity to the ground in the area in which the weeds or grass are to be cut. The flexible cutting strings 177 will be rotated as the cutting attachment 176 is rotated to cut the weeds and/or grass. In the event hard objects such as rocks and the like are struck by the cutting strings 177, the cutting strings 177 can be deflected out of the way into the annular recesses 186 and 199 provided between the vertically disposed walls 182 and 191. As soon as the obstruction has been cleared, the normal stiffness of the cutting strings 177 as well as the centrifugal force will cause the cutting strings to be moved outwardly to again assume their normal cutting positions.

It should be appreciated that a cutting attachment 176 of the type shown in FIGS. 9 and 10 can be modified to also include cutting blades of the type hereinbefore described utilized in the previous embodiments. Thus as shown in FIG. 11, the upper or second body section 179 can be modified to receive cutting blades 236 of the type hereinafter described which are secured by bolts 237 to the upper side of the second body section 179 and disposed in recesses 238 provided therein. In such a construction, the blades 236 will operate in the same manner as described in the previous embodiments and will operate in conjunction with the cutting elements 177 to perform the desired trimming and cutting operations. In the event an object is struck, the cutting blades 236 will be moved into an out-of-the way position within the recesses 238 so that they will not be damaged. Similarly, the strings 177 will also be moved into the recess 186 and 179 when a hard object is encountered.

As soon as the obstruction has been passed, the cutting blades 236 will be moved outwardly under centrifugal force as will the cutting elements 177.

It also should be appreciated that if desired the cutting blades can be mounted on the first body section 178 so that they underlie the cutting strings 177. Such an embodiment is shown is FIG. 12 in which cutting blades 241 are secured by bolts 237 to the first lower body section 178 and are seated within recesses 238. The operation of this embodiment of the invention is very similar to that described in conjunction with FIG. 12. The cutting blades 241 are positioned below the cutting strings 177 In the event an object is struck, the cutting blades 241 will also be pushed within the confines of the body and protected as will the cutting strings 177. As soon as the obstruction has been cleared, the blades 241 will swing out as will the cutting strings 177 because of centrifugal force. In addition, the cutting strings 177 because of their inherent stiffness will also spring outwardly as soon as the obstruction has been cleared.

It is apparent from the foregoing that there has been provided various embodiments of cutting attachments which have many advantageous common features. They all are provided with a rigid body construction in which the lower or first body section serves as a skid plate which can readily skid over small rocks or other obstructions. The bolts which are utilized for fastening the two sections together are recessed so they are protected from wear. The inner portion of the cutting attachment is provided with a relatively smooth truncated inner conical surface which inhibits the collection of weeds, grass and debris. The construction of the cutting attachment is such that the cutting blades and/or cutting strings can readily move into protective recesses with the confines of a rigid body when an obstruction is encountered.

What is claimed is:

1. In a cutting attachment for a cutting device, first and second mating body sections forming a rigid body, said first body section having a generally vertical side wall portion, a downwardly and inwardly inclined bottom wall portion, an upwardly and inwardly extending wall portion adjoining said bottom wall portion, said second body section having a generally vertical side walls portion, an inwardly extending and generally horizontal portion adjoining said generally vertical portion, an upwardly and inwardly inclined portion adjoining said horizontal portion, means interconnecting said first and second body sections to form a rigid body and to cause said upwardly and inwardly extending portion of said first body section and said upwardly and inwardly inclined portion of said second body section to adjoin each other to provide a relatively smooth inner surface in the form of a truncated cone the generally vertical side wall portions of the first and second body sections defining the outer confines of the body, coupling means carried by the upwardly and inwardly inclined portion of said second body section adapted to be coupled to the cutting device and a plurality of cutting elements carried by the body and being movable between cutting positions extending outside of the outer confines of the body and out-of-the-way positions within the outer confines of the body.

2. A cutting attachment as in claim 1 wherein said cutting elements are in the form of blades and means for mounting the blades on the second body section on the generally horizontal portion.

3. A cutting attachment as in claim 1 wherein said cutting elements are in the form of flexible cutting strings.

4. A cutting attachment as in claim 1 wherein said means interconnecting the first and second body sections includes recessed bolts.

5. A cutting attachment as in claim 1 wherein said cutting elements are in the form of a plurality of blades carried by one of the first and second body sections and a plurality of flexible cutting strings carried by the body.

6. A cutting attachment as in claim 5 wherein the cutting blades overlie the cutting strings.

7. A cutting attachment as in claim 5 wherein the blades underlie the cutting strings 8. A cutting attachment as in claim 5 wherein said blades are mounted on the first body section.

9. A cutting attachment as in claim 5 wherein said blades are mounted on the second body section.

10. A cutting attachment as in claim 2 when each of said blades is provided with first and second cutting surfaces so that the blade when it is disposed in one position, the first cutting surface is placed in cutting position during operation of the cutting attachment and when it is placed in a second position, the second cutting surface will be placed in cutting position during operation of the cutting attachment.

11. A cutting attachment as in claim 1 wherein said cutting elements are in the form of blades having at least one leading cutting edge with the cutting edge having first and second portion with one portion extending at an angle with respect to the other portion.

* * * * *